(No Model.)
J. A. HINSON.
THILL COUPLING.
No. 439,778. Patented Nov. 4, 1890.
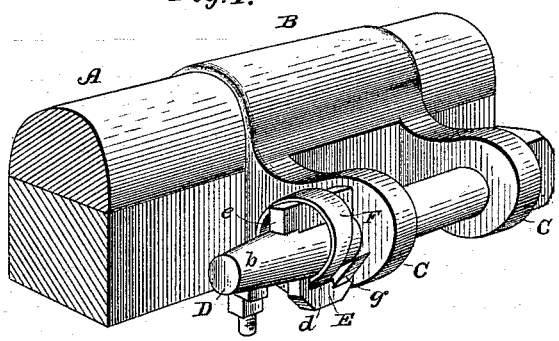
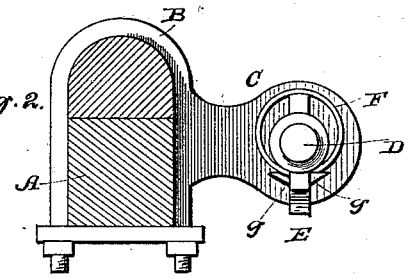
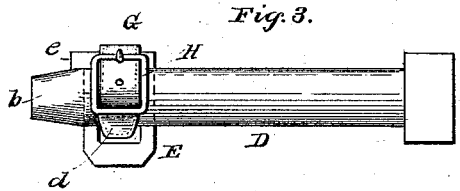
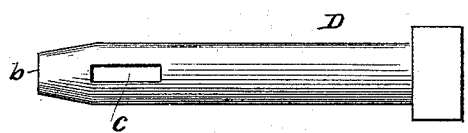
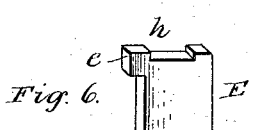
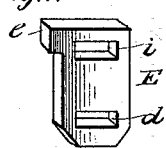
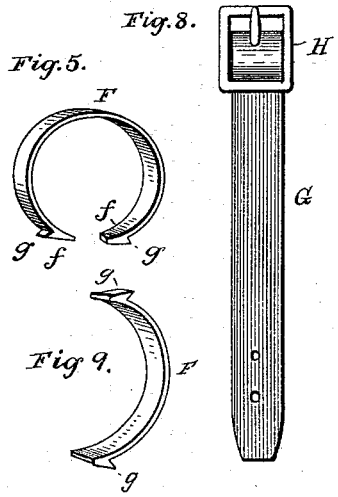
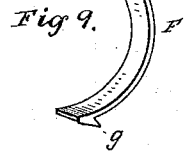
ATTEST.
Victor J. Evans.
M. A. Redmond.
INVENTOR.
James A. Hinson
By W. A. Redmond, Atty.
THE NORRIS PETERS CO., PHOTO-LITHO., WASHINGTON, D. C.

UNITED STATES PATENT OFFICE.

JAMES A. HINSON, OF DES MOINES, IOWA.

THILL-COUPLING.

SPECIFICATION forming part of Letters Patent No. 439,778, dated November 4, 1890.

Application filed March 10, 1890. Serial No. 343,379. (No model.)

*To all whom it may concern:*

Be it known that I, JAMES A. HINSON, a citizen of the United States, residing at Des Moines, in the county of Polk and State of Iowa, have invented certain new and useful Improvements in Thill-Couplings; and I do hereby declare the following to be a full, clear, and exact description of the invention, such as will enable others skilled in the art to which it appertains to make and use the same.

This invention relates, generally, to thill-couplings for vehicles, and particularly to the bolts and means for retaining the same securely in position; and it has for its object to provide a simple, durable, and inexpensive device for securing the thills to the axles of vehicles without liability of the fastening means becoming loosened and permitting the thills to drop, and which may at the same time be readily and easily detached when necessary to remove the thills; and it consists in the parts and combinations of parts hereinafter described and claimed.

In the accompanying drawings, forming a part of this specification, Figure 1 is a perspective view of my improved thill-coupling; Fig. 2, an end view of the thill-coupling; Fig. 3, a side view of the bolt with strap attachment; Fig. 4, a plan view of the bolt; Fig. 5, a perspective view of the metallic strap; Fig. 6, a perspective view of the key; Fig. 7, a modified form of the key; Fig. 8, a plan view of the strap, and Fig. 9 a perspective view of the strap bent in a different form.

Similar letters refer to similar parts throughout the several views.

A represents a portion of the axle of a vehicle, and B a clip secured thereto in the usual manner, said clip having perforated lugs or ears C projecting therefrom at right angles to the axle, as is customary, to receive the thill-iron between them.

D represents a bolt having a head of any desired shape or configuration at one end and having its other end tapered, as at $b$, and having a slot $c$ formed therein adjacent the tapered end. This bolt is formed or cast without screw-threads and is a true cylinder from the head to the point at its opposite end where it begins to taper.

E represents a flat key formed of metal and having a slot $d$ formed therein at or near its lower end and a shoulder $e$ at its head or upper end on one edge, thus increasing the width of the key at its upper end and forming a stop to prevent the key slipping through the slot $c$ in the bolt. The lower end of the key is beveled off at its corners, so that it may be readily and easily inserted in the slot of the bolt in order to hold and secure said bolt in place after it has been passed through the ears of the clip and the thill-iron. The key is formed of a size adapted to fit snugly and tightly in the slot of the bolt; but owing to the constant shaking and jarring of the vehicle while in use the key soon becomes loose and drops out, thus permitting the bolt to work out of position and the thills to fall to the ground, frequently frightening the animals attached to the vehicle and causing them to run away and endangering the lives of the occupants of the vehicle and other persons. To obviate this I provide simple but secure means for fastening the key in place in a practically rigid manner, but which may be easily removed therefrom in order to remove the key and the bolt as occasion requires. To accomplish this I take a narrow strip of spring metal and reduce its ends at opposite sides or edges, as at $f$, and form an offset or shoulder $g$ at each end thereof. This strip of metal I term the "spring-strap" F, and it is bent in circular form with its respective ends standing at a short distance from each other, but not in line, and may be bent so as to insert the ends from opposite sides of the key in the slot $d$ of the key, and force the same through the slot until the offsets or shoulders $g$ engage the lower or bottom opposite edges of the slot and lock the strap in place, and thus prevent the accidental withdrawal of the key from the slot in the bolt. The strap, as clearly shown in Fig. 1, fits over the top or head of the key and thus lends additional security to the fastening, and it may be simply passed over the head of said key, as shown in said figure, and secured by a screw, if desired, or it may be fitted in a slot $h$, formed therein, as shown in Fig. 6, in order to prevent all possibility of its working off the head of the key; also, I may pass the strap through a slot $i$, formed in the key above a line drawn from the bottom edge of the shoulder $e$, as shown in Fig. 7, which will prevent the strap from working out of position as well as secure the key and strap together when not in use.

Instead of reducing the ends of the strip of metal forming the strap, I may make it of the same width throughout its length and form the shoulders or offsets g either by bending said ends backward or otherwise and bending the strap to a bow shape, as shown in Fig. 9, and inserting one of its ends in the slot d and the other in the slot i until the offsets or shoulders g engage the edges of the slots on the side opposite that to which they enter the slots. I have discovered by practical experiment that a strap of leather G, Figs. 3 and 8, having a buckle H, can be used in lieu of the metallic strap by passing the end of the same through the slot d, and either over the top of the key or through the slot i, and, drawing the same tight, secure it by means of the buckle; but as the leather strap is not so durable I prefer a metallic strap, as described, formed of spring metal.

The advantage of the means herein described for securing the key in place, aside from the great security it affords, is that the bolt is not rigidly held in place in the perforated ears or lugs of the clip, but may turn freely therein without any liability of working out of said ears or lugs, thus permitting of the uniform and equal wear of the bolt on all sides when in use, and not on one side only, as is the case where the bolt is held rigidly or prevented turning freely in the ears. It will also be observed that the means employed to fasten the key in place may be readily and easily removed when necessary without the use of tools of any sort.

Having thus described my invention, what I claim as new, and desire to secure by Letters Patent, is—

1. In a thill-coupling, the combination, with a clip having perforated ears, of the bolt having a slot in one end, the key having a slot near its lower end, and a flexible strap adapted to enter the slot and over the top of said key, substantially as described.

2. In a thill-coupling, the combination, with a clip having perforated ears or lugs, of the bolt having a slot formed in one end, the key having a slot near its lower end and a slot at its top, and means, substantially as described, adapted to pass through said slot and over the top of said key to secure the same in place, substantially as set forth.

3. In a thill-coupling, the combination, with a clip having perforated ears, of the bolt having a cylindrical body portion and a tapering end and having a slot near its tapering end, the key having a shoulder at one end, a slot near its upper end and a slot near its lower end, and means, substantially as described, adapted to pass through said slots to secure said key in place, substantially as set forth.

4. In a thill-coupling, the combination, with a clip having perforated ears or lugs, of the bolt having a slot in one end, the key having a slot near its lower end, and a strap provided with means for securing it to the key, said strap being adapted to pass through said slot and over and about said key and bolt, substantially as described.

5. In a thill-coupling, the combination, with a clip having perforated ears or lugs, of the bolt having a slot near one end, the key having a shoulder at one end, a slot near its lower end and a slot near its upper end, and the flexible strap having the offsets or shoulders at its ends adapted to enter said slots and engage the edges thereof, substantially as described.

In testimony whereof I affix my signature in presence of two witnesses.

JAMES A. HINSON.

Witnesses:
J. F. BEALE,
VICTOR J. EVANS.